(12) United States Patent
Helms

(10) Patent No.: US 6,880,256 B2
(45) Date of Patent: Apr. 19, 2005

(54) ALIGNMENT DEVICE

(75) Inventor: David B. Helms, Denton, TX (US)

(73) Assignee: PACCAR Inc, Bellevue, WA (US)

( * ) Notice: Subject to any disclaimer, the term of this patent is extended or adjusted under 35 U.S.C. 154(b) by 65 days.

(21) Appl. No.: 10/371,530

(22) Filed: Feb. 21, 2003

(65) Prior Publication Data

US 2004/0163265 A1 Aug. 26, 2004

(51) Int. Cl.$^7$ .............................................. G01C 15/00
(52) U.S. Cl. ............................ 33/286; 33/227; 33/264; 33/DIG. 21; 33/645
(58) Field of Search ........................ 33/286, 227, 264, 33/645, DIG. 21, 288; 116/28 R

(56) References Cited

U.S. PATENT DOCUMENTS

| | | | |
|---|---|---|---|
| 3,442,476 A | 5/1969 | Trimble | 248/43 |
| 3,491,334 A | 1/1970 | Martin | 340/34 |
| 3,850,041 A | 11/1974 | Seaman | 73/495 |
| 4,349,965 A * | 9/1982 | Alsina | 33/288 |
| 4,953,909 A | 9/1990 | Crane | 296/136 |
| 5,014,946 A | 5/1991 | Gruber | 248/206.5 |
| 5,063,679 A * | 11/1991 | Schwandt | 33/347 |
| 5,266,955 A | 11/1993 | Izumi et al. | 342/70 |
| 5,453,740 A | 9/1995 | Gallagher et al. | 340/903 |
| 5,463,384 A | 10/1995 | Juds | 340/903 |
| 5,575,073 A * | 11/1996 | von Wedemayer | 33/285 |
| 5,650,765 A | 7/1997 | Park | 340/436 |
| 5,731,779 A | 3/1998 | Kikuchi | 342/70 |
| 5,734,336 A | 3/1998 | Smithline | 340/903 |
| 6,026,353 A | 2/2000 | Winner | 702/183 |
| 6,082,011 A * | 7/2000 | Phillips, III | 33/288 |
| 6,157,294 A | 12/2000 | Urai et al. | 340/436 |
| 6,178,650 B1 * | 1/2001 | Thibodeaux | 33/286 |
| 6,184,800 B1 | 2/2001 | Lewis | 340/932.2 |
| 6,335,705 B1 * | 1/2002 | Grace et al. | 343/703 |
| 6,386,572 B1 * | 5/2002 | Cofer | 33/264 |
| 6,622,390 B1 * | 9/2003 | Brusius | 33/286 |
| 6,708,782 B1 * | 3/2004 | Turney | 33/286 |
| 6,823,600 B1 * | 11/2004 | Vaughan | 33/DIG. 21 |

* cited by examiner

Primary Examiner—G. Bradley Bennett
Assistant Examiner—Yaritza Guadalupe
(74) Attorney, Agent, or Firm—Sidley Austin Brown & Wood LLP

(57) ABSTRACT

An alignment device is provided for aligning an object mounted to a fixture in a desired orientation. The alignment device includes a level, a laser, a plurality of positioning members, and a suction device in fluid communication with a vacuum generator, and preferably an angular rotation indicator. The suction device removably engages the alignment device with the object to be aligned. Utilizing the alignment device, a technician can simultaneously adjusted a horizontal and vertical (pitch) orientation of an object and a rotation of the object until the object is aligned according to the desired orientation. The alignment device can further include a separate but cooperative adjustable stabilizing frame having a plurality of stabilizers. The stabilizing frame is expandable and retractable to be secured about the object, and the stabilizers can be adjusted to maintain the desired orientation of the object relative to the fixture.

26 Claims, 9 Drawing Sheets

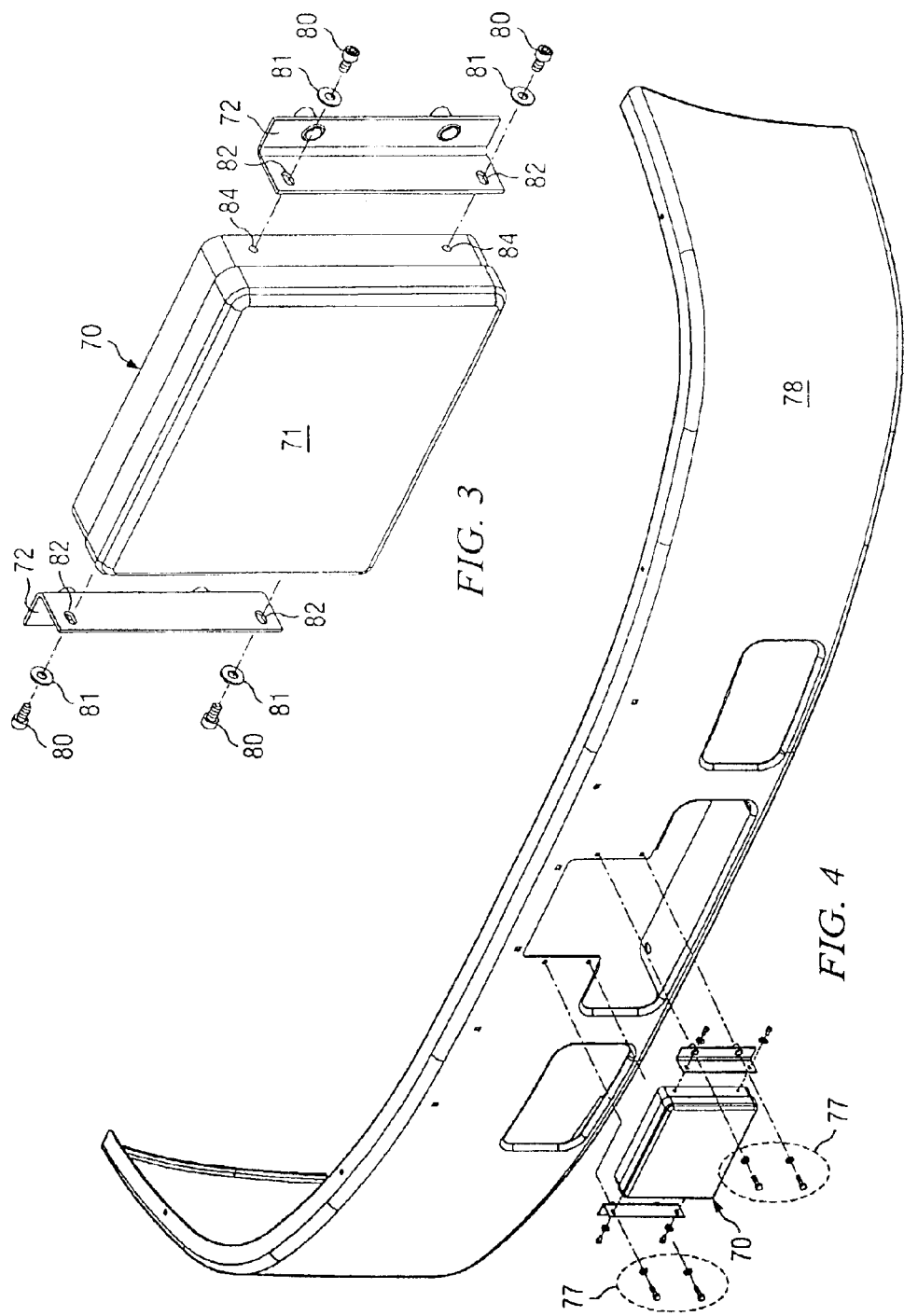

ALIGNMENT DEVICE

FIELD OF THE INVENTION

The invention relates broadly to alignment devices and methods for using such devices to properly align a fixture-mounted object in a desired orientation. More specifically, the invention relates to an apparatus and method for aligning a vehicle mounted antenna, used as part of a collision warning system, along a thrust line of a vehicle.

BACKGROUND OF THE INVENTION

Commercial trucks often utilize a conventional collision warning system, such as the Eaton VORAD® EVT-300 Collision Warning System, to alert the driver that there is an obstacle in the path of the vehicle. This warning provides the driver with valuable time to steer the vehicle around the obstacle, thereby potentially avoiding a collision with the obstacle. Conventional collision warning systems typically utilize an antenna mounted to a bumper or chassis of a vehicle wherein the antenna is generally aligned with a centerline of the vehicle bumper. In operation, the antenna picks up and relays signals to the collision warning system when obstacles are detected in the direction of alignment of the antenna. However, if the antenna is slightly misaligned in a horizontal or vertical plane and thus oriented at an incorrect direction and pitch angle (i.e., the antenna is directed at a distant point away from the direction of travel of the vehicle), the collision warning system may properly alert drivers of obstacles a short distance from the vehicle but will not pick up obstacles further ahead in the path of the vehicle. Thus, in order for the collision warning system to be effective, it is particularly important that the antenna be properly aligned both horizontally along a thrust line or direction of travel of a vehicle and vertically (in pitch) a distance ahead along the thrust line or direction of travel of the vehicle, and not merely haphazardly positioned in a direction generally straight ahead of the vehicle.

As will be appreciated by those skilled in the art, optimal operation of a collision warning system requires the antenna to be properly aligned both horizontally and vertically at a desired pitch angle along a direction of travel of a vehicle. FIG. 10 illustrates that a horizontal component of a vehicle thrust line 86 may occasionally be offset from a vehicle centerline 88. This is because the vehicle thrust line 86 is determined by the direction or orientation of the axles of the vehicle while the vehicle centerline 88 is determined by the orientation of the body or frame of the vehicle. Thus, merely placing the antenna 70 along the centerline 88 of the vehicle and aligning it thereto does not necessarily align the antenna with the thrust line 86 of the vehicle 76.

By way of explanation, thrust angle is the line that divides the total angle of the rear wheels. The rear tires of a vehicle are not just following the front tires, they are actually establishing direction of the vehicle, and in doing so, a direction of thrust is developed. The thrust angle created by the rear wheels is used as a reference for aligning the front wheels. Ideally, the thrust angle should be identical to the geometric centerline of the vehicle. If the thrust angle and geometric centerline are identical, the position of the tires would then form an absolute rectangle and the front tires could be aligned to the rear tires, resulting in a perfectly centered steering wheel. Because of factory tolerances and a varying degree of damage and/or wear, it is increasingly unlikely that the axles will be parallel. When the rear axle projects a different angle than the front axle, the driver will need to turn the steering wheel to compensate in order to drive in a straight line. In such cases, alignment of the antenna 70 with the vehicle thrust line 86, rather than the vehicle centerline 88, will increase the accuracy and sensitivity of the collision warning system. Additionally, the vertical or pitch orientation of the antenna may need to be adjusted out of true vertical to insure that the antenna is directed according to the desired orientation (e.g., at the ground immediately in front of or a distance away from the vehicle rather than level straight ahead of the vehicle). Additionally, the thrust line for one vehicle may vary from that of another due to variations in wheel-base and vehicle design styles between different vehicle models, and may even vary among vehicles of the same design as a result of variations in construction such as wheel axle alignment, dimensions, and position, even where such variations are within acceptable tolerances. It has therefore been difficult in the past to determine a single fixed reference point for a vehicle thrust line which is repeatable for all vehicles. Many different methods or devices for determining a vehicle thrust line have been devised over the years to determine or measure the thrust line of a vehicle. Accordingly, when an alignment device is used to align an antenna for a vehicle collision warning system, or the like, it is preferably utilized in combination with a device or method which accurately establishes a thrust line 86 of a vehicle, or alternatively with a device or method for determining a desired horizontal and vertical (pitch) orientation.

Current alignment methods are laborious, multi-step processes, each step of which has the potential of incurring errors in alignment. When such errors are combined, the resulting overall error can be significant. According to one current method, an operator first loosely mounts an antenna to the vehicle bumper along a center line of the vehicle. The operator then checks for vertical alignment (up or down) of the antenna by placing a level along a side of the antenna until the level indicates that the antenna has been properly vertically aligned in pitch. Following this, the operator removes the level and, while attempting to maintain the position of the antenna in the vertical alignment, secures the antenna to the bumper with securing screws or other fasteners. While attempting to maintain the vertical alignment, the operator then must adjust the antenna horizontally with respect to the thrust line of the vehicle. This horizontal adjustment requires loosening the antenna from the bumper, thereby potentially affecting the vertical alignment. Currently, horizontal alignment (left and right) of the antenna is accomplished by identifying two reference points symmetrical about the truck centerline and using a six foot straight edge clamped to the vehicle to connect the two points. Unfortunately, the tortuous shape of the vehicle bumper makes clamping a long straight edge difficult and imprecise. Further, clamping potentially distorts the shape of the bumper or deflects the shape of a plastic housing to a degree which skews the measurement. Moreover, this method generally is able to align the antenna horizontally only with respect to the centerline of the vehicle and does not insure that the antenna will be aligned both horizontally and vertically along the thrust line of the vehicle. In addition, in order to adjust the antenna into proper horizontal alignment, the antenna must be unsecured from the previously established vertical alignment position. Once the securing screws are loosened, it is difficult to precisely and delicately control the movement of the antenna in the horizontal plane without also affecting the vertical alignment. Thus, misalignment in either or both planes is common.

A need therefore arises for an alignment device and method of using the same which allows a single technician to quickly and easily secure an object substantially in a desired horizontal and vertical orientation with respect to a fixture in a manner that further ensures that both horizontal and vertical alignment are achieved and preserved when the object is secured to the fixture.

It would also be desirable to have an alignment device and method of using the same which, following alignment, maintains the object substantially in the desired horizontal and vertical orientation even when the technician is not physically supporting the alignment device, such as while the technician is securing the object to the fixture.

More particularly, what is needed for a particular application is an antenna alignment device and a method for using the device which allows for quick, easy, and reliable horizontal and vertical alignment of a vehicle mounted antenna by a single technician such that the antenna is aligned both vertically and horizontally along a thrust line of a vehicle.

Additionally, what is needed is an alignment device that can be successfully employed with any device or method for determining a thrust line of a vehicle or any other desired alignment orientation.

SUMMARY OF THE INVENTION

An object of the present invention is to allow a single technician to quickly and easily align an object in a desired orientation with respect to a fixture to which it is mounted and to further ensure that the alignment is preserved when the object is secured to the fixture.

Another object of the present invention is to provide a device which maintains the object substantially in the desired orientation even when the technician is not physically supporting the alignment device.

Yet another object of the present invention is to provide an alignment device and a method for using the device which allows for quick, easy, and reliable alignment of a vehicle mounted antenna such that the antenna is aligned substantially in a desired orientation with respect to a desired position, such as in a direction along a thrust line of a vehicle.

Still another object of the present invention is to provide an alignment device that that can be successfully employed with any device or method for determining a thrust line of a vehicle or any other desired alignment orientation.

According to a first embodiment of the present invention, an alignment device is provided for aligning an object mounted to a fixture in a desired orientation with respect to a desired position. The alignment device is an assembly which comprises: a mounting plate having a first side and a second side; a plurality of positioners and a suction device each extending outwardly from the second side of the mounting plate; a level mounted to the first side of the mounting plate; a laser supported by a laser mount mounted to the first side of the mounting plate; and a vacuum generator positioned on the first side of the mounting plate. A toggle switch coupled to a plurality of air hose connectors or air intake valves is in fluid communication with the vacuum generator. A pair of handles extending outwardly substantially adjacent opposing ends of the first side of the mounting plate provides grasping members for positioning the alignment device upon the object to be aligned, and provides a hand hold for maneuvering the object into alignment with a predetermined desired position and maintaining the object in position while the object is being secured to the fixture in the desired orientation.

According to the first embodiment, the level is preferably positioned vertically along one end of the mounting plate. The level is used to determine vertical (pitch) orientation of the object. The laser is preferably substantially centrally disposed along the horizontal centerline of the mounting plate and emits laser light or a laser beam projected forward to a projection surface thereby delineate visually the horizontal orientation of an object. Vertical alignment is achieved when the level indicates that the object is oriented in a predetermined angular (pitch) orientation. Horizontal alignment of the object is achieved by aligning the laser beam emitted by the laser with a horizontal component of a predetermined desired position.

According to a second embodiment of the invention, the alignment device of either the first embodiment further includes a separate but cooperating adjustable stabilizing frame comprising a plurality of adjustable stabilizers having gripping members which are adapted to be positioned to make contact with the fixture and stabilize the object with respect to the fixture during and following alignment. When the adjustable stabilizers are adjusted, the extending length of protruding stabilizers varies. Thus, the corresponding gripping members are repositioned in distance to make contact with the fixture thereby preventing the object from moving relative to the fixture and maintaining the object in the desired orientation. The orientation of the object can also be subtly adjusted by minute adjustment of the positioners.

While for illustrative purposes only, the alignment device of the present invention will be described and illustrated herein as an alignment device for simultaneously adjusting horizontally and vertically an alignment of a vehicle mounted antenna for a collision warning system, or other type of system utilizing a vehicle mounted antenna, it will be appreciated by those skilled in the art that the alignment device of the present invention can be likewise described and illustrated for use with other types of fixture-mounted objects. Thus, the scope of the invention described herein is not limited thereto.

BRIEF DESCRIPTION OF THE DRAWINGS

FIG. 3 is an exploded perspective view of an exemplary antenna and mounting system;

FIG. 4 is an exploded perspective view of the exemplary antenna and mounting system of FIG. 3 including an exemplary bumper of a vehicle;

FIG. 8 is an exploded view of the cooperating adjustable stabilizing frame of FIG. 7a;

DETAILED DESCRIPTION OF THE INVENTION

The illustrations and descriptions herein specifically describe the alignment device of the present invention being used to simultaneously align a vehicle mounted antenna (or other fixture mounted object) horizontally and vertically (in pitch) along a direction of travel of a vehicle, i.e., along a thrust line of a vehicle (the desired orientation). It is therefore apparent that the apparatus and method described herein is particularly useful for alignment of a vehicle mounted antenna, but this preferred application of the alignment device is not the only application for which the present invention can be used. It will be appreciated by those skilled in the art that the apparatus and method could be similarly extended for use in aligning any fixture-mounted object. The scope of the invention is therefore not limited to alignment of a vehicle mounted antenna.

Figure 1:
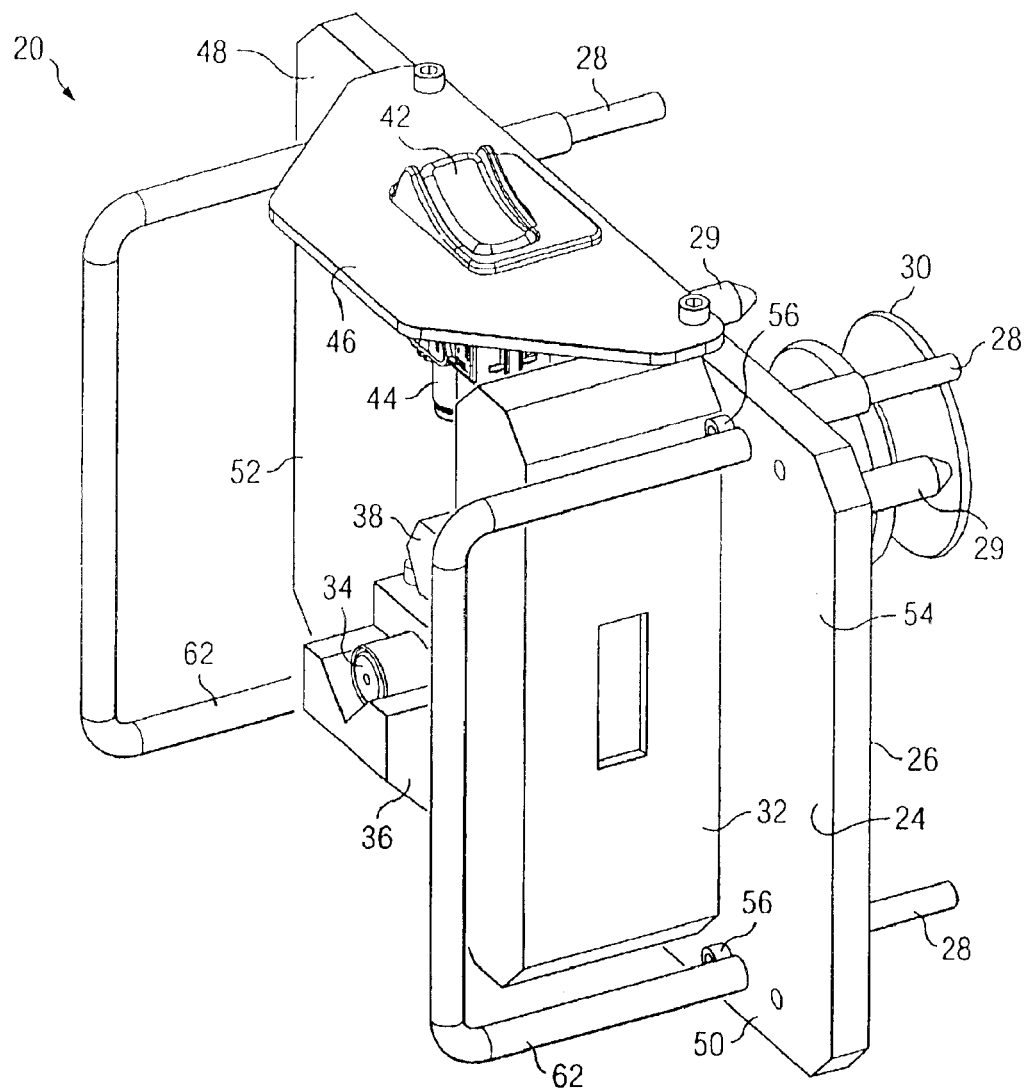
FIG. 1 is a perspective view of an alignment device according to a first embodiment of the present invention.
Figure 2:
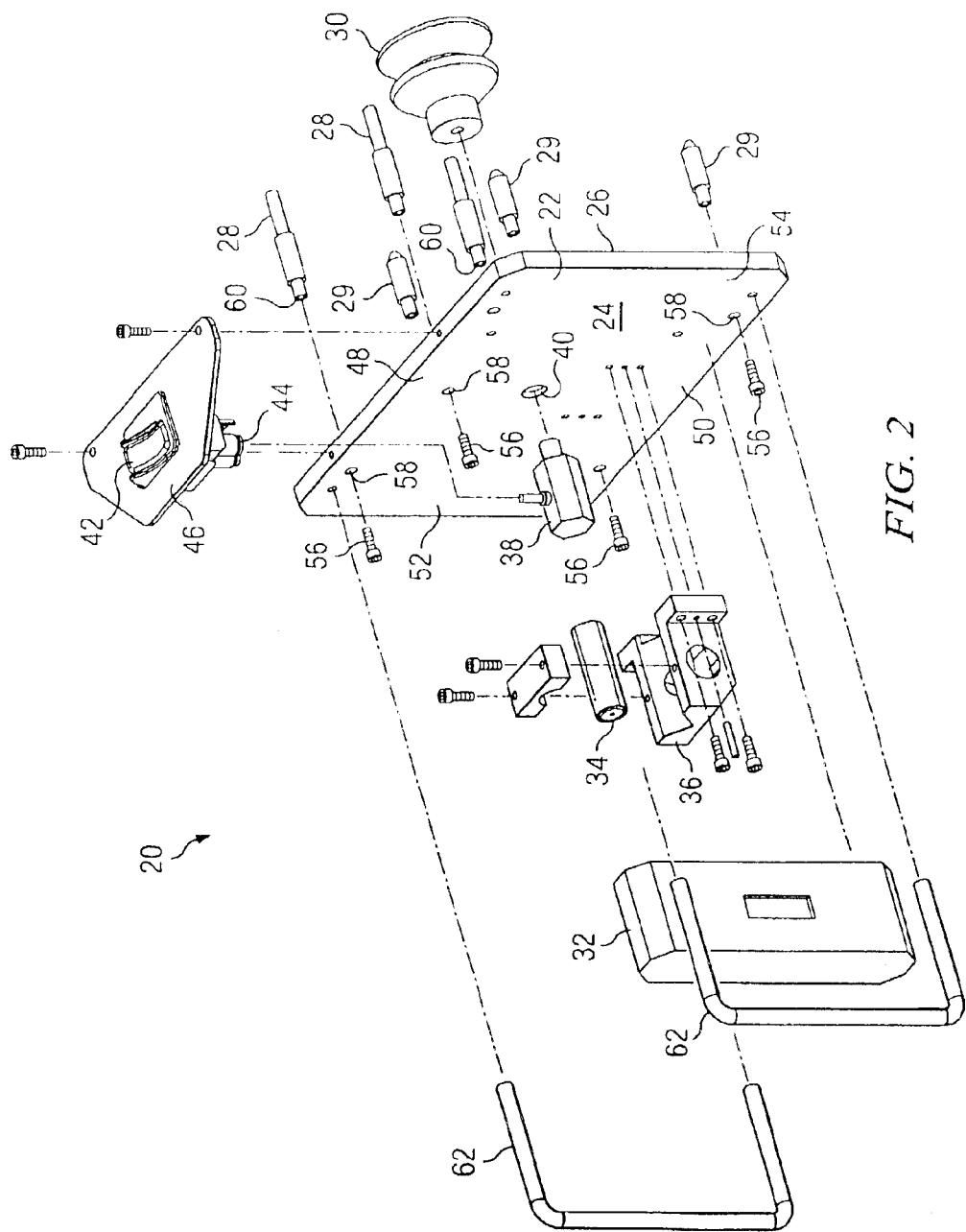
FIG. 2 is an exploded view of the alignment device of FIG. 1.

FIG. 1 is a perspective view of a first embodiment of an alignment device 20 for simultaneously horizontally and vertically aligning a fixture-mounted object with respect to a predetermined desired orientation. Referring also to FIG. 2, which illustrates the first embodiment of the alignment device 20 as an assembly comprising: a mounting plate 22 having a first side 24 and a second side 26; a plurality of positioners 28, a plurality of distancing pins 29, and a suction device 30 each extending outwardly from the second side 26 of the mounting plate 22; a level 32, preferably digital, and a laser 34 supported by a laser mount 36 mounted to the first side 24 of the mounting plate 22; and a vacuum generator 38 positioned on the first side 24 of the mounting plate 22. The vacuum generator 38 is in fluid communication with the suction device 30 positioned on the second side 26 of the mounting plate 22 through a hole 40 defined in the mounting plate 22. A toggle switch 42 adapted to switch the suction device 30 on and off is coupled to a plurality of air hose connectors or air intake valves 44 in fluid communication with the vacuum generator 38 by means commonly understood in the art. Toggle switch 42 preferably extends outwardly from an extension plate 46 secured to the mounting plate 22 and overhanging the first side 24 such that toggle switch 42 and air hose connectors 44 are accessible from the first side 24 of the mounting plate 22 without interference with the laser 34 or level 32. Preferably, the suction device 30 is a bellows style suction cup in communication with a venturi vacuum generator; however, another type of suction device or vacuum generator could instead be used. While not illustrated herein, if desired, the alignment device assembly of the first embodiment 20 could also include a level, protractor, or other degreed rotational indicator to indicate a rotational orientation of an object about a central axis of the object. This would allow for reorienting the object into a desired rotational or other angular orientation relative to a mounting position of the object on the fixture.

According to the first embodiment, the level 32 is preferably positioned vertically along one end of the mounting plate 22 (from a top 48 to a bottom 50 of the first side 24 of the mounting plate 22) such that a viewing window is viewable. Thus, the level 32 indicates a vertical orientation (pitch) of an object. Preferably, the laser 34 is substantially centrally disposed along a horizontal centerline of the mounting plate 22, as measured from a left end 52 to a right end 54 of the mounting plate 22. The laser 34 projects laser light onto a projection surface (partially illustrated as 64 in FIG. 10), thereby visually delineating a horizontal orientation and a vertical orientation of an object.

The alignment device assembly 20 is adapted to receive a fixture-mounted object. The plurality of positioners 28 on the second side 26 of the mounting plate 22 are preferably positioned such that an object fits easily, yet snuggly, therebetween. Preferably, each of the plurality of positioners 28 is coupled with a corresponding threaded fastener 56, or other securing means, which are preferably accessible from the first side 24 of the mounting plate 22. Each threaded fastener 56 extends through a correspondingly positioned hole 58 in the mounting plate 22 and into a corresponding threaded opening 60 defined in a corresponding one of the plurality of positioners 28. Preferably, each of the plurality of positioners 28 is extensible or retractable to a desired length by means of rotation of the corresponding threaded fastener 56 in order to extend or retract the positioners 28, as may be desired. This allows for the alignment device 20 to be used with objects having a variety of thicknesses. Alternately, other types of positioners 28 could be employed so long as they are adapted to properly position the object with respect to the alignment device 20. Further, it is preferable that a location of each of the plurality of positioners 28 be adjustable with respect to the mounting plate 22 (e.g., be repositioned on the mounting plate) such that a single alignment device 20 could be used to align objects having a variety of sizes and shapes. Preferably, the plurality of distancing pins 29 serve as spacers and establish a set off distance between the object and the second side of the mounting plate 22 such that the suction device or other clamping device functions properly. Preferably, the length of the plurality of distancing pins 29 is also extensible or retractable. Preferably, the plurality of distancing pins 29 are at least three distancing pins arranged in a triangular arrangement about the suction device. However, alternate geometric arrangements and numbers could instead be employed. Additionally, a pair of handles 62 preferably extends outwardly substantially adjacent opposing ends of the first side of the mounting plate (left end 52, right end 54). The pair of handles 62 can serve as grasping members for positioning the alignment device 20 upon the object, for providing a hand hold for a technician when maneuvering or reorienting the object during alignment, and for manually stabilizing the reoriented object while the object is being secured to the fixture in the aligned orientation.

As already noted, the alignment device is preferably adapted for simultaneously aligning a fixture-mounted object horizontally and vertically into a predetermined desired orientation. A preferred method of using an alignment device 20 according to the present invention will now be described. The object is first loosely attached to a fixture by loosely mounting the object to brackets or other securing devices which have been securely attached to the fixture. The object is loosely mounted to allow for some play in all dimensions for reorientation of the object into the desired horizontal and vertical (pitch) orientation relative to the fixture and possibly a desired rotational alignment. The alignment device is then installed thereon and utilized to adjust the object into alignment with the predetermined desired orientation. Once the object is properly oriented, the object can be manually stabilized in the desired orientation while securing the object to the brackets such that the desired orientation is maintained. Because the indicators for both horizontal and vertical alignment (the laser and the level) are integral with the alignment device, the horizontal and vertical orientation or alignment can be visually monitored to insure that the object is not misaligned during the securing process. As necessary, the horizontal and vertical alignment can therefore be monitored and readjusted simultaneously with securing the object to the fixture.

Figure 10:
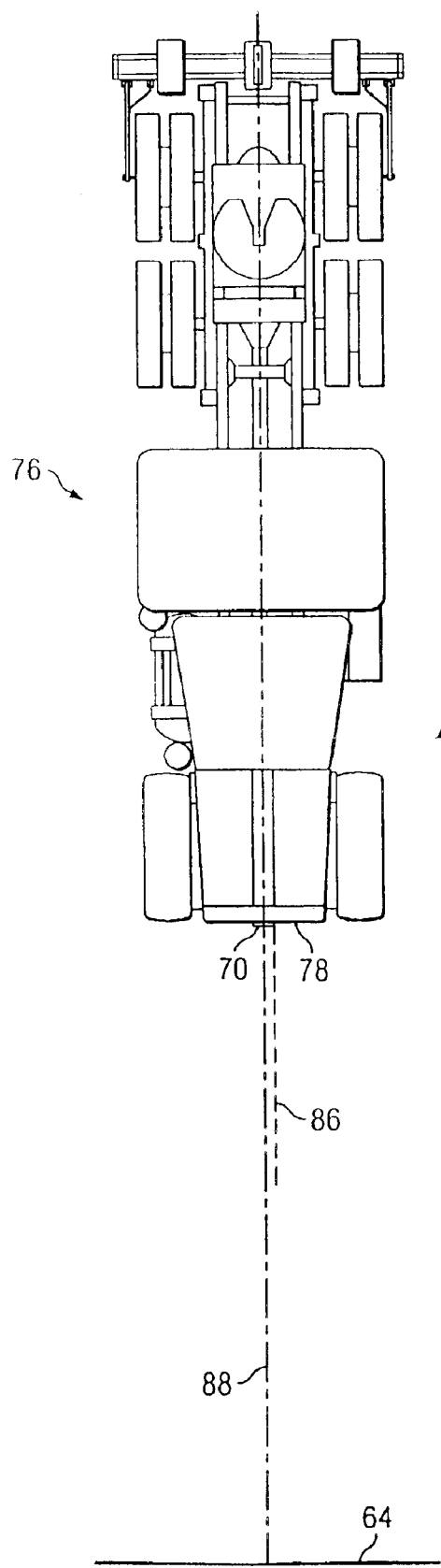
FIG. 10 is a top view of an exemplary vehicle and exemplary bumper-mounted antenna illustrating a potential difference between a center line of a vehicle and a horizontal component of a thrust line of a vehicle.

Referring now to FIGS. 3, 4, and 10, an exemplary antenna 70, such as an antenna for a collision warning system or other type of system utilizing a vehicle mounted antenna, is illustrated. The antenna 70 is first loosely mounted to a pair of brackets 72 (or other securing device) which have been securely mounted to a vehicle 76 using screws and washers 77 (or other types of fastening devices). The antenna 70 can therefore be reoriented relative to the brackets 72, yet still be retained thereby. With respect to an antenna for a collision warning system, each one of the pair of brackets 72 is preferably installed on a bumper 78 of the vehicle 76 substantially equidistant from a centerline 88 of the vehicle 76 (as illustrated in FIG. 4). In this manner, loosely securing an antenna 70 to the brackets 72 will cause a centerline of the antenna 70 to be initially positioned substantially at the centerline 88 of the vehicle 76 (illustrated in FIG. 10) with a face 71 of antenna 70 projecting outward away from the vehicle. The antenna 70 can be loosely mounted to brackets 72 using screws 80 and washers 81 (or other known fastening devices) inserted through slotted openings 82 defined in the brackets 72, and further inserted into corresponding threaded holes 84 defined in sides of the antenna 70. The arrangement of the slotted openings 82 in the pair of brackets allows some play in the adjustment of an attitude, pitch, and position of the antenna 70 in three dimensions. Thus, because the antenna is loosely mounted to the brackets, the antenna position relative to the bumper of the vehicle can be adjusted. While illustrated in a horizontal orientation on the brackets, it will be appreciated by those skilled in the art that the slots could additionally or alternately be provided in a vertical and or other angular arrangement on the brackets. Thus, the antenna could potentially be rotated to some degree by merely loosening or tightening appropriate screws 80 or other fastening devices while adjusting the orientation of one side of the antenna without having to fully release the antenna from the brackets or the brackets from the vehicle. Also, while illustrated with respect to the connection of the antenna with the brackets, it will be appreciated by those skilled in the art that slots could similarly be provided along the connection of the brackets with the bumper 78.

Figure 5:
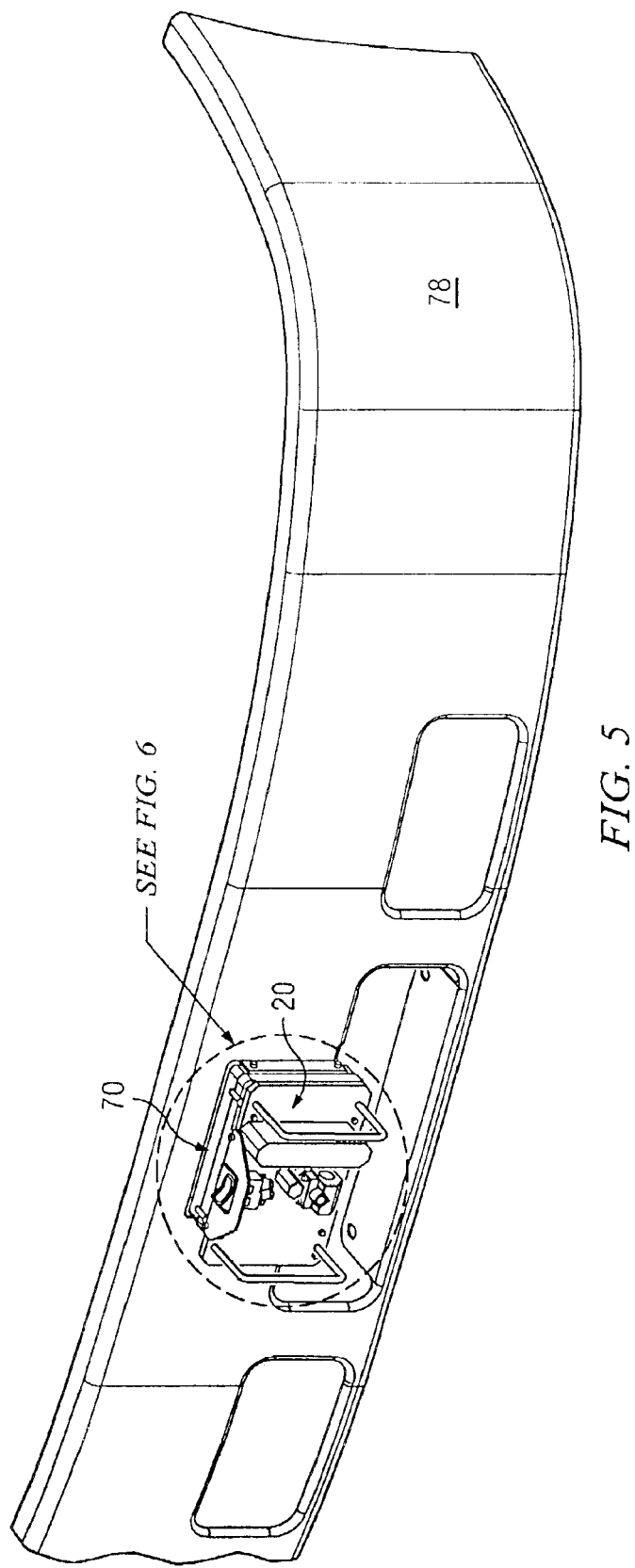
FIG. 5 is a perspective view of the first embodiment of the alignment device illustrated in FIG. 1 operatively coupled to the antenna illustrated in FIGS. 3 and 4, which has been mounted to the exemplary bumper of a vehicle.
Figure 6:
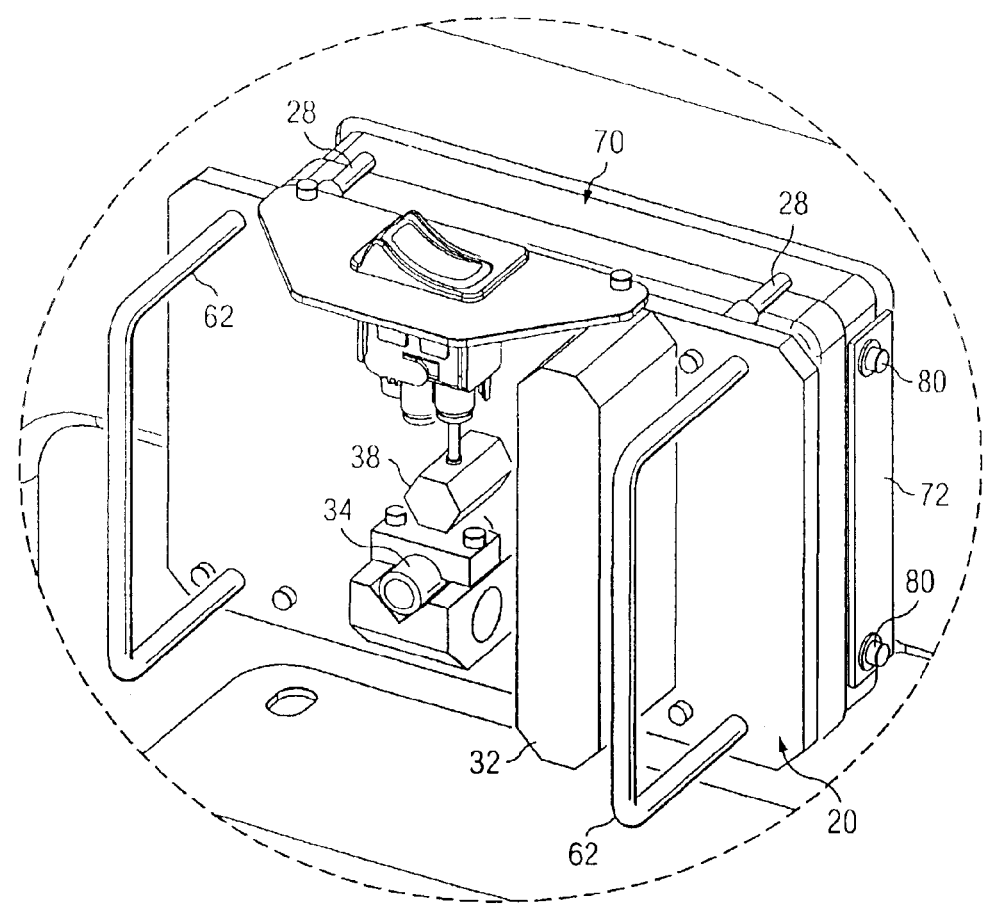
FIG. 6 is a close up perspective view of the indicated portion of FIG. 5.

FIGS. 5 and 6 illustrate the assembly of the first embodiment of the alignment device 20 installed on the exemplary vehicle bumper mounted antenna of FIG. 3. As illustrated, the antenna 70 fits securely between the plurality of positioners 28. According to the first embodiment of the alignment device 20, the alignment device 20 is preferably removably engaged to the face 71 of antenna 70 using a suction device 30 on the second side 26 of mounting plate 22 (illustrated in FIGS. 1 and 2). A vacuum drawn through the vacuum generator 38 provides suction to the suction device 30 (illustrated in FIG. 1), and thus engages the alignment device 20 with the face 71 of antenna 70. This is preferably accomplished by drawing compressed ambient air into the vacuum generator 38. Alternatively, tanks of compressed air or other vacuum generating means could instead be utilized. Once the alignment device 20 is engaged to the antenna 70, the alignment device 20 does not move relative to the antenna 70 during the alignment process. The antenna 70 is released from engagement with the alignment device 20 when the vacuum condition is removed from the suction device.

Once the antenna 70 has been engaged by the alignment device 20, the level 32 can be used to indicate a vertical orientation (pitch) of the antenna. When the level 32 indicates that the desired vertical orientation has been achieved, the antenna 70 is in vertical alignment. The desired vertical angular orientation may vary depending on the application, i.e., the desired vertical alignment of antenna 70 may be a true vertical orientation or may be at a predetermined pitch angle relative to vertical. Horizontal alignment is obtained by rotating or maneuvering the alignment device 20, and thus the antenna coupled thereto, until a beam of light emitted from the laser 34 on alignment device 20 is substantially aligned with a predetermined horizontal component of the desired orientation. In the preferred application of an antenna for a vehicle collision warning system, the desired orientation would be substantially along a thrust line 86 of the vehicle, as illustrated in FIG. 10. Because both the laser 34 and the level 32 are attached to the alignment device 20, simultaneous adjustment of the antenna 70 in both the horizontal and vertical directions should be possible by only a single technician. If a degreed rotational indicator is also coupled with the alignment device, then the single technician could also align the antenna relative to a desired rotational orientation. When the antenna 70 has been properly oriented in the desired orientation, the technician can quickly and accurately tighten the antenna 70 to the brackets 72 using one hand while simultaneously holding the antenna 70 in the proper orientation using the handles 62 of the alignment device 20. Once the antenna 70 has been securely attached to the brackets 72 by tightening of the securing screws 80, and before the alignment device 20 is disengaged from antenna 70, a last quick visual check of the laser light and the level can be performed to ensure that neither the horizontal nor the vertical alignment were disturbed during the securing process. One benefit of the alignment device 20 of the present invention is that it can be successfully employed with any device or method for determining a thrust line of a vehicle or any other desired alignment orientation.

Figure 7A:
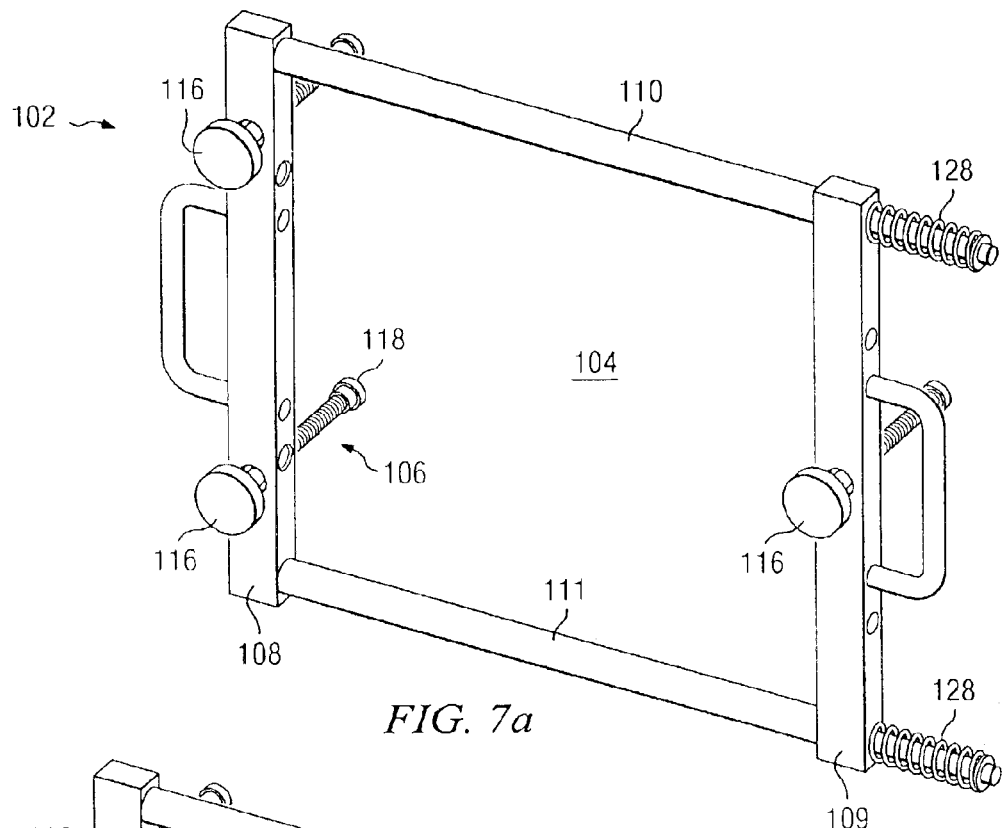
FIG. 7a is a perspective view of a cooperating adjustable stabilizing frame according to a second embodiment of the invention.
Figure 7B:
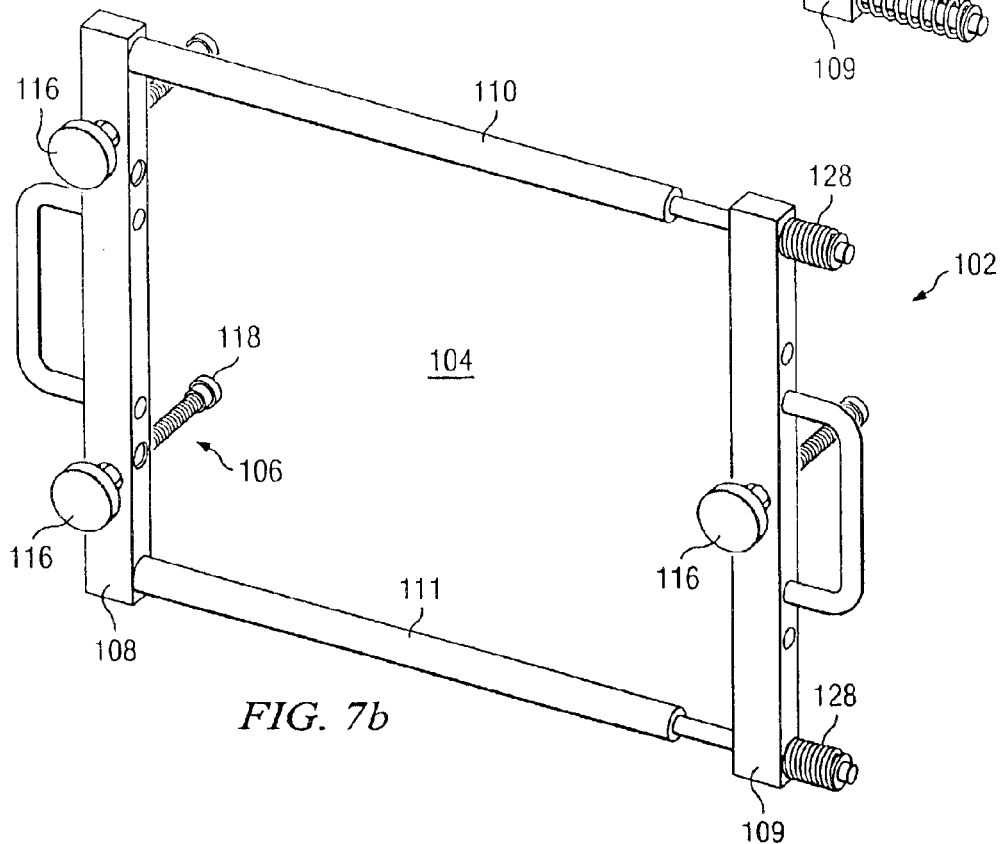
FIG. 7b is a perspective view of the cooperating adjustable stabilizing frame of FIG. 7a in an expanded state.
Figure 8:
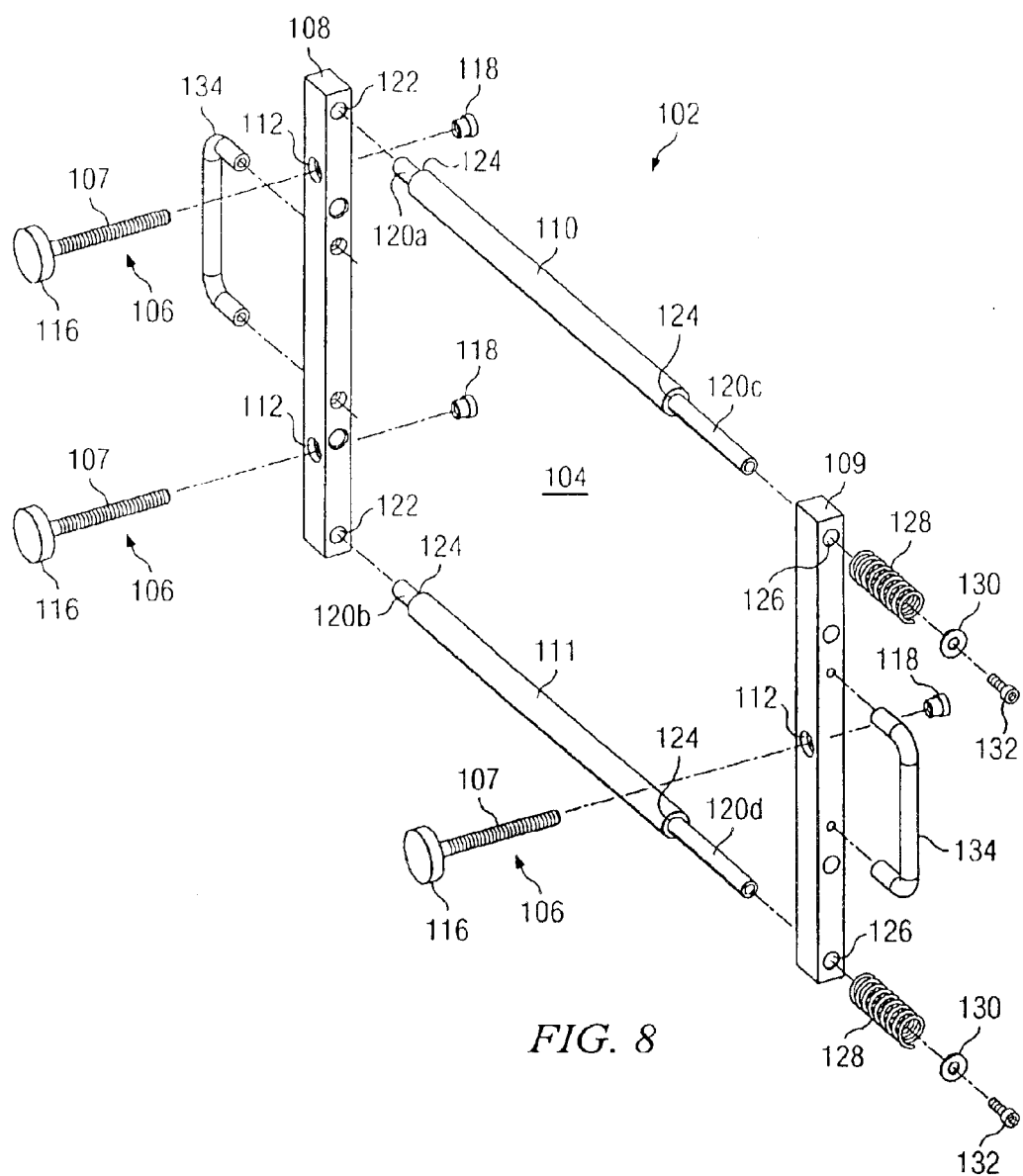
Figure 9:
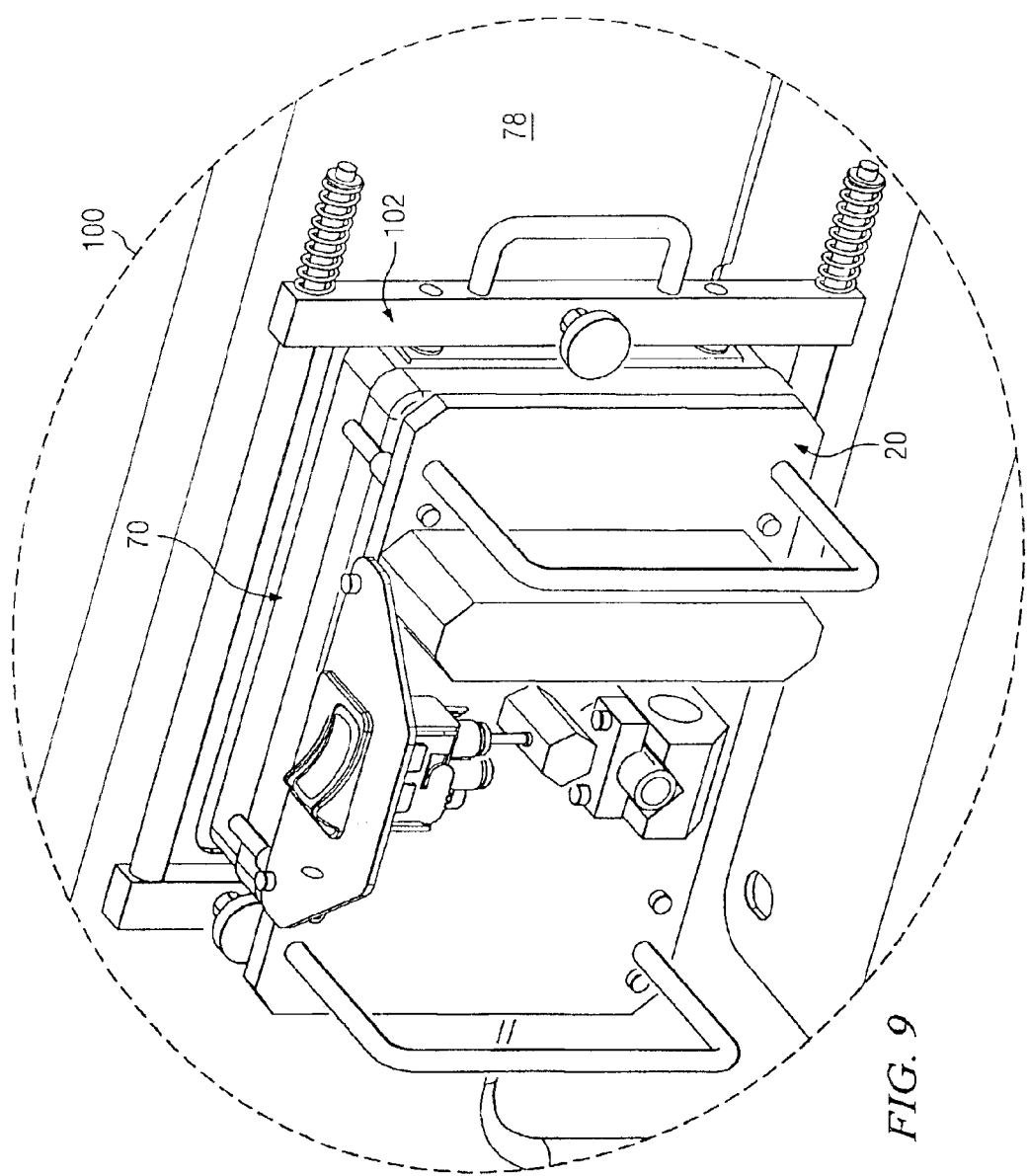
FIG. 9 is a perspective view of a second embodiment of the invention, which includes an adjustable stabilizing frame in cooperation with the first embodiment of the alignment device coupled to an exemplary bumper-mounted antenna.

FIGS. 7a, 7b, and 8 illustrate an expandable adjustable stabilizing frame 102 that can be used in combination with the first embodiment of alignment device 20 to form a second embodiment of alignment device 100 shown in FIG. 9. FIG. 9 illustrates the second embodiment of the present invention cooperatively utilized with the first embodiment of the alignment device 20 and engaged with an antenna 70 mounted to a vehicle 76 in preparation for alignment. While the stabilizing frame 102 is illustrated herein having a particular size, shape, and configuration, one skilled in the art would understand that the adjustable stabilizing frame 102 can be formed in any shape, size, or configuration so long as it defines an adjustable sized space 104 for receiving and securing a fixture-mounted object. As illustrated, the adjustable stabilizing frame 102 has a plurality of adjustable threaded stabilizers 106 adapted to extend or retract, thus enabling the adjustment and maintenance of a particular orientation of a fixture-mounted object relative to the fixture. Using the adjustable stabilizing frame 102 in conjunction with the alignment device 20 of the first embodiment allows for a finer, steadier, more precise adjustment of the antenna position and orientation during alignment. Further, utilizing the adjustable stabilizing frame 102 in conjunction with the alignment device 20 of the first embodiment allows a single technician to maintain an object in a desired orientation even when the technician has released manual hold of the alignment device 20. Still further, the adjustable stabilizing frame 102 can continue to stabilize the object in the desired orientation even when the alignment device 20 has been released or removed from the object.

FIG. 8 is an exploded view illustrating how one particular embodiment of the adjustable stabilizing frame 102 of FIG. 7a is assembled. As shown, the adjustable stabilizing frame 102 comprises: a pair of substantially parallel beams 108, 109, which are moveable relative to one another; a pair of substantially parallel cross members 110, 111 separating the beams 108, 109; and a plurality of threaded stabilizers 106 extending through and beyond correspondingly threaded receiving holes 112 defined in predetermined locations through the beams 108, 109. The beams 108, 109 and cross members 110, 111 are assembled such that they substantially define a space 104 therebetween. Each threaded stabilizer 106 includes a threaded rod 107, having ends extending beyond opposing sides of the beams. Threaded rods 107 are therefore longer than a depth of the threaded receiving holes 112 in beams 108, 109. A knob 116 is disposed on ends of each threaded rod 107 extending beyond one side of beams 108, 109. A gripping member 118 is disposed on ends of each threaded rod 107 extending beyond another side of beams 108, 109.

According to the embodiment illustrated in FIG. 8, end portions 120a–120d, respectively, of each end of cross members 110, 111 have a narrower diameter than an intermediate portion of the cross members, thereby forming respective lips 124 in the cross members 110, 111. One end portion 120a, 120b of each of the pair of cross members 110, 111 is slideably inserted into receiving holes 122 defined in the first beam 108. The end portions 120a, 120b are securely coupled to the first beam 108 by any means now known or later developed, including but not limited to: friction fit, securing fasteners, adhesives, or any combination thereof. The remaining end portions 120c, 120d of cross members 110, 111 slideably extend through and beyond receiving holes 126 defined in the second beam 109 such that the second beam 109 is slideable thereon. The receiving holes 122, 126 defined in beams 108, 109, respectively, are preferably smaller in diameter than the lips 124 formed on cross members 110, 111. Thus, a distance between the lips defines a minimum separation distance between the beams 108, 109, and thus a minimum width of the space 104.

A biased spring 128 and a washer 130 are inserted onto the end portions 120c, 120d of cross members 110, 111 extending beyond the second beam 109, thereby biasing the second beam 109 toward the first beam 108. A securing screw 132 or other known securing device maintains the spring 128 and washer 130 on cross members 110, 111, respectively. As illustrated in FIG. 7b, handles 134 coupled to beams 108, 109 provide leverage for moving the second beam 109 against the biasing force of springs 128 into an expanded form. A length of the end portions 120c, 120d extending beyond the second beam 109 and a length and biasing force of the springs 128 determine a maximum separation distance between the beams 108, 109, and thus a maximum width of the space 104.

For illustrative purposes only, the operation of the second embodiment will now be described in relation to use in aligning the vehicle mounted antenna of FIGS. 3 and 4. However, it will be appreciated by one skilled in the art that the alignment device 100 could be adapted for use with any of a variety of fixture-mounted objects.

As illustrated in FIG. 9, in operation, the expandable stabilizing frame 102 is disposed about a periphery of a vehicle mounted antenna 70. The biasing springs 128 snug the two beams 108, 109 inward against the antenna 70 and mount the stabilizing frame 102 securely thereto. The alignment assembly 20 of the first embodiment is then secured to the antenna 70 as described earlier, such that the alignment assembly 20 and the stabilizing frame 102 combine to form a second embodiment of the alignment device 100. After the alignment is performed using alignment assembly 20, the gripping members 118 of the plurality of adjustable threaded stabilizers 106 can be positioned to contact the bumper 78 of vehicle 76. This is accomplished by turning of knobs 166, thereby rotating threaded rod 107 through threaded opening 112 and moving gripping members 118 into contact with the vehicle 76. Once the gripping members 118 of the stabilizing frame 102 are firmly in contact with the vehicle, the alignment assembly 20 can be disengaged from the antenna 70 by switching toggle switch 42 to off, thereby shutting off suction from the suction device. Once the alignment assembly 20 is disengaged, the gripping members 118 maintain the antenna 70 in the desired orientation until the antenna 70 can be tightly secured to the bumper 78 of the vehicle 76, thus preventing inadvertent misalignment of antenna 70 during the securing process. Additionally, small adjustments of the adjustable threaded stabilizers 106 in contact with the bumper 78 of the vehicle 76 allow finer, more careful adjustment of the orientation of the antenna during the alignment process.

Using the alignment device assembly 20 alone or in cooperation with the stabilizing frame 102 described above allows a single technician to quickly and easily secure an object in a desired orientation. Additionally, when using the stabilizing frame 102, the object can be stabilized in the desired orientation and the alignment assembly 20 can be removed from the object while the stabilizing frame 102 remains to maintain the orientation until the object is tightly secured to the mounting brackets.

Having thus described several embodiments of the invention, it is apparent that using the alignment device described above allows a single technician to quickly and easily secure an antenna in a desired orientation which is preferably along a thrust line of a vehicle. It is recognized, however, that those skilled in the art may make various modifications or additions to the preferred embodiments chosen to illustrate the invention herein without departing from the scope or spirit of the present contribution to the art. Thus, while the alignment device described herein is illustrated with respect to the alignment of a vehicle mounted antenna for a collision warning system, it will be appreciated by those skilled in the art that the alignment device described herein could be adapted to simultaneously align, horizontally, vertically, and possibly rotationally, any of a variety of objects other than antennas, which are mounted to any of a variety of fixtures other than vehicle bumpers. By way of example, and not by way of limitation, alternate fixtures may include: automobiles, buses, trains, wheelchairs, golf carts, motorcycles, cranes or other construction vehicles. Further, a fixture may also be a stationary object such as would be convenient for mounting an antenna or other object. Additionally, while it has been described herein that the object is to be aligned with a thrust line of a vehicle, it will be appreciated by those skilled in the art that the object may instead be aligned according to other desired orientations. Further, while the cross members are illustrated as being fixed relative to each other, it is possible that the cross members could also be adjustably related. Also, while it has been illustrated that the narrow diameter end portions of the cross members are inserted into corresponding diameter holes in the beams, it will be appreciated by those skilled in the art that other means of attachment could be employed such that the cross member had a substantially consistent diameter throughout. Moreover, while it is herein illustrated that the adjustable stabilizing frame has a beam or side piece which is moveable relative to the other portions of the frame and which employs biased springs to secure the frame about an object, it will be appreciated by those skilled in the art that the stabilizing frame could instead employ a partially or completely detachable beam or side piece utilizing other securing means, such as but not limited to: clips, pins, expandable bands, or straps and buckles, to insert the frame about an object and secure the moveable beam into position on the frame. Even further, while it was herein illustrated that the alignment device is detachably secured to the object by means of suction provided to the suction device by a vacuum generator, it will be appreciated by those skilled in the art that other detachable securing methods or apparatuses can instead be employed. By way of example, and not by way of limitation, securing methods or apparatuses such as screws, pins, clips, tacky strips, magnets, and dissolvable adhesives may be used. Moreover, while various embodiments having various arrangements of the levels and laser have been illustrated, it will be appreciated by those skilled in the art that alternate embodiments having different arrangements could instead be used. Still further, while the antenna alignment device is illustrated for use on a forward facing collision warning device, it could likewise be used to align an antenna for a rearward facing system, which would indicate obstacles in the path of a vehicle as it is backing up, or even in a side facing system. The antenna alignment device could also be used in combination with a computer system that can be programmed to automatically perform alignment and stabilization using the antenna alignment device of the current invention. Thus, the scope of the invention is not limited merely thereto. Accordingly, it is to be understood that the protection sought and to be afforded hereby should be deemed to extend to the subject matter claimed and all equivalents thereof fairly within the scope of the invention.

What is claimed is:

1. An alignment apparatus for aligning an antenna mounted on a fixture, the alignment apparatus comprising:
    a mounting plate having a first and second side and having a plurality of positioning members on the second side for properly positioning the antenna with respect to the alignment apparatus,
    a laser secured to the first side of the mounting plate;
    a level secured to the first side of the mounting plate; and
    an attachment mechanism for detachably securing the mounting plate to the antenna.

2. An alignment apparatus according to claim 1, further comprising an angular rotational indicating device secured to the mounting plate.

3. An alignment apparatus according to claim 1, wherein the attachment mechanism comprises:
    a suction cup mounted on the second side of the mounting plate; and
    a vacuum generator mounted on the first side of the mounting plate in fluid communication with the suction cup.

4. An alignment apparatus according to claim 3, wherein the attachment mechanism further comprises a plurality of fluid ports fluidly connecting the vacuum generator and the suction cup.

5. An alignment apparatus according to claim 3, wherein the vacuum generator is a venturi type vacuum generator.

6. An alignment apparatus according to claim 3, wherein the attachment mechanism further comprises a toggle switch for switching the vacuum generator on and off.

7. An alignment apparatus according to claim 1, wherein the mounting plate further comprises at least one handle.

8. An alignment apparatus according to claim 7, wherein the at least one handle extends outwardly from the first side of the mounting plate.

9. An alignment apparatus according to claim 1, wherein the level indicates a vertical orientation of the antenna and the laser indicates a horizontal orientation of the antenna.

10. An alignment apparatus according to claim 9, wherein the level is digital.

11. An alignment apparatus according to claim 1, further comprising an adjustable frame, said adjustable frame comprising:
    a plurality of sides defining a space therebetween, wherein at least one of said plurality of sides is moveable relative to the others such that the space has an adjustable size; and
    a plurality of adjustable stabilizers each coupled to one of the plurality of sides.

12. An alignment apparatus according to claim 11, each of the plurality of adjustable stabilizers having a first end and a second end and having a gripping member disposed on the first end and a knob disposed on the second end.

13. An alignment apparatus according to claim 1, wherein the fixture is a bumper of a vehicle, and wherein the antenna is mounted to the bumper using at least one mounting bracket.

14. An alignment apparatus according to claim 13, wherein the at least one mounting bracket defines a plurality of slots through which the antenna is adjustably secured by a corresponding plurality of fastener devices.

15. An alignment apparatus according to claim 13, wherein a thrust line of the vehicle defines a desired horizontal component of a desired orientation of the antenna.

16. An alignment method comprising the steps of:
    installing an alignment device onto a vehicle-mounted antenna loosely secured to a vehicle, the alignment device comprising a mounting plate, a laser attached to the mounting plate, and a level attached to the mounting plate;
    using the level to substantially align the antenna in a desired vertical orientation;
    using the laser to substantially align the antenna in a desired horizontal orientation; and
    tightening the vehicle-mounted antenna to the vehicle while substantially maintaining the antenna in both the desired vertical orientation and the desired horizontal orientation.

17. An alignment method according to claim 16, wherein the alignment device further comprises a suction mechanism attached to the mounting plate for detachably installing the alignment device onto the vehicle-mounted antenna.

18. An alignment method according to claim 16, wherein a thrust line of the vehicle defines the desired horizontal component of the desired orientation of the vehicle-mounted antenna.

19. An alignment device for aligning an object relative to a fixture, said alignment device comprising:
    an orientation-indicating assembly attachable to the object, the orientation-indicating assembly comprising:
        a mounting plate;
        a plurality of positioners for positioning the object therebetween within the orientation-indicating assembly;
        an alignment laser secured to the mounting plate; and
        a level secured to the mounting plate;

wherein the level indicates a vertical orientation of the object, and wherein the alignment laser indicates a horizontal orientation of the object.

20. An alignment device according to claim 19, wherein the orientation-indicating assembly further comprises a suction device in fluid communication with a vacuum generator mounted to the mounting plate for detachably securing the orientation-indicating assembly to the object.

21. An alignment device according to claim 20, wherein the suction device is a bellows style suction cup, and wherein the vacuum generator is a venturi vacuum generator.

22. An alignment device according to claim 19, said alignment device further comprising:

an adjustable frame operative in combination with the orientation-indicating assembly, said adjustable frame having at least one movable side for detachably securing the adjustable frame about a peripheral edge of the object, and having a plurality of adjustable stabilizers for contacting the fixture and maintaining an orientation of the object relative to the fixture.

23. An alignment device according to claim 19, wherein the object is an antenna and the fixture is a bumper of a vehicle.

24. An alignment device according to claim 19, wherein the fixture is a bumper of a vehicle and a desired orientation of the object is defined by a thrust line of the vehicle.

25. An alignment device for aligning an antenna mounted to a vehicle according to a predetermined horizontal orientation and a predetermined vertical orientation, the alignment device comprising:

an orientation-indicating assembly comprising:
 a mounting plate having a first and second side;
 a laser secured to the first side of the mounting plate;
 a digital level secured to the first side of the mounting plate;
 a plurality of positioners on the second side of the mounting plate for positioning the antenna within the orientation-indicating assembly;
 a suction mechanism for detachably securing the antenna to the orientation-indicating assembly, said suction mechanism having a suction cup mounted on the second side of the mounting plate, a venturi vacuum generator mounted on the first side of the mounting plate in fluid communication with the suction cup, and a toggle switch for switching the vacuum generator on and off; and
 at least one handle on the mounting plate;

an adjustable frame operative in combination with said orientation-indicating assembly, said adjustable frame comprising:
 a plurality of sides defining a space therebetween, wherein at least one of said plurality of sides is moveable relative to the others such that the space has an adjustable size; and
 a plurality of adjustable stabilizers for at least temporarily stabilizing the antenna relative to the vehicle subsequent to alignment of the antenna in the predetermined horizontal and vertical orientations, wherein the predetermined horizontal orientation and the predetermined vertical orientation are defined by a thrust line of the vehicle.

26. An alignment device according to claim 25, said alignment device further comprising:

at least one mounting bracket defining a plurality of slots through which the antenna is adjustably secured to the vehicle, wherein the mounting bracket can tightly secure the antenna to the vehicle subsequent to alignment of the antenna in the predetermined desired orientation.

* * * * *